Figure 1:
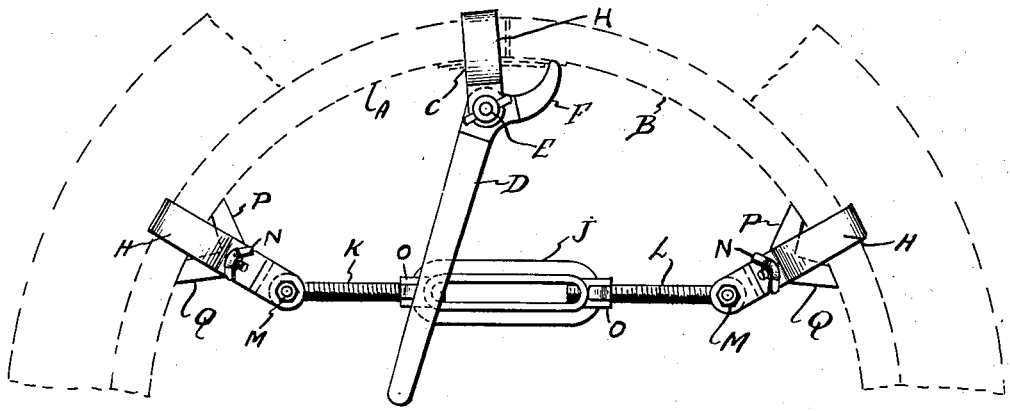

Patented Sept. 9, 1924.

1,507,748

UNITED STATES PATENT OFFICE.

GUSTAVE A. MEYER, OF DETROIT, MICHIGAN.

RIM-REMOVING APPARATUS.

Application filed August 31, 1922. Serial No. 585,381.

*To all whom it may concern:*

Be it known that I, GUSTAVE A. MEYER, a citizen of the United States, residing at Detroit, county of Wayne, State of Michigan, have invented a certain new and useful Improvement in Rim-Removing Apparatus, and declare the following to be a full, clear, and exact description of the same, such as will enable others skilled in the art to which it pertains to make and use the same, reference being had to the accompanying drawings, which form a part of this specification.

This invention relates to apparatus for effecting the centripetal release of a wheel rim from the inner face of a tire, and has for its object an improved organization of parts whereby this may be effected easily and without undue bending of the metal rim, even though it be rusted or "frozen" to the adjacent tire surface. In the case of some tires and rims the use of a part only of the apparatus herein described is necessary, but in other instances, as, for example, as in the case of a very heavy rim, or where the adhesion between the tires and the rim is unusually tenacious, it sometimes becomes necessary to supplement this with the remaining portion of the apparatus that I have devised, working the parts in alternation.

Figure 2:
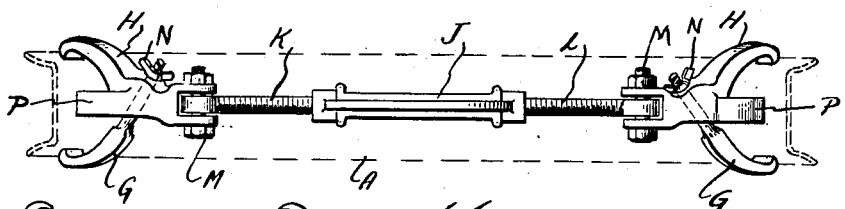
Figure 3:
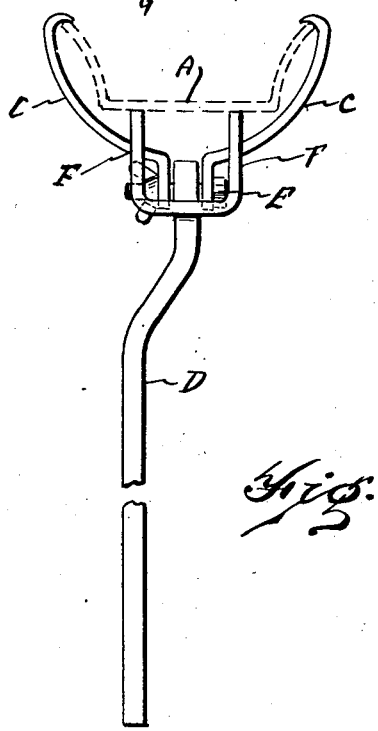
Figure 4:
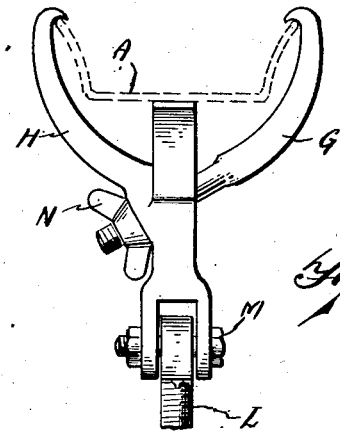

In the drawings:

Figure 1 is a side elevational view of my apparatus in position about the rim of a vehicle wheel, ready for the drawing apart action upon the meeting ends, Figure 2 is a plan view from above of the turnbuckle-actuated portion of the apparatus in position with respect to a wheel rim, a portion of the latter being dotted in in proper relative position, Figure 3 is an end elevational view, taken at right angles to the position shown in Figure 1, of the member shown in the upper and central portions of Figure 1, Figure 4 is an enlarged detail view of one pair of the clamping hooks designed to bring out the adjustability of the branches, to compensate for variations in the breadth and depth of the wheel rim.

A and B represent the meeting ends of a metal wheel rim, which in service are ordinarily firmly connected with one another by a screw or bolt attached to a cross-over piece C. In numerous makes of tires the preferred method of separating the rim from from the inner face of the tire, when repairs to either one become necessary, involves a centripetal drawing in or bending of the rim relatively to the inner face of the tire, and often the rim and tire have become adherent to a degree that makes their separation a matter of great difficulty, especially the initial drawing out of line of their meeting ends after the cross-over piece C has been detached. To efficiently deal with this I have devised the prying or leverage member shown in side and end elevation in Figures 1 and 3 respectively consisting of a handle D, whose inner end terminates in a laterally projecting nose or pair of bearing points F, whose tip is adapted to engage against the adjacent inner surface of the wheel rim as a fulcrum point, pressing outwardly against that portion as, B while the hook-tipped jaws G and H engage over the edges of other rim end A; being adjustably joined, as at E, with the elbow connecting the handle D and projections F, these jaws and their engaged rim end are drawn inwardly with great force when the handle D is swung strongly to the right, from the position shown in Figure 1. When this pull has resulted in a slight or starting separation of the rim end A from the adjacent inner surface of the tire, the position of the detaching apparatus may be reversed so that the end of the nose F may engage against the inner face of the rim end A, while the jaws G and H engage over the edges of the rim end B. A swing of the lever D in the opposite direction from that just described now exercises a corresponding centripetal pull upon the rim end B, and this start at separation of the rim surfaces from the inner face of the tire sometimes suffices.

If, however, the adhesion between the rubber and metal persists throughout a considerable portion of their peripheral line of union, the additional and co-operating use of the remaining portion of my apparatus becomes necessary. This latter consists of a turnbuckle J, preferably provided at its ends with flat wrench-hold surfaces O, and in whose threaded ends engage the screws K and L, to the outer end of each of which is pivotally linked, as at M, the inner or central stem portion of a pair of correlated jaw members of the same type as G and H already described.

To provide for variations in the depth and breadth of different sizes and makes of wheel rims, one of the jaw members, as G, is made adjustable relatively to its companion jaw H, by being screw-threaded at its lower end, so that, as viewed in Figure 4, for example, the extent of its projection either upwardly or outwardly may be regulated by the use of the adjusting nut N. Projecting from one or both faces of the jaw member as a whole, in a plane located at right angles to that in which the branches G and H lie, are a pair of leverage projections as P and Q. These latter are adapted, when the arms G and H are in position about the edge of a wheel rim, to lie with their ends against the surface thereof, and, as brought out in Figure 1, each of these pairs of jaw members G and H being located at an appreciable distance on either side of the point of meeting of the rim ends, and each extending radially inward, when the turnbuckle J is actuated, the draw upon the jaw members G and H is not directly radial, but is such as to draw more heavily on the side at which the projections P are located.

In practice it is sometimes best to start the loosening operation by first slightly expanding the rim so that its ends will be drawn away from one another. This is accomplished by attaching the turnbuckle apparatus to spacedly separated points on each side of the break in the rim, as already described, and actuating the turnbuckle so that the screws K and L are projected outwardly, thus pressing each set of jaw pieces against the rim and thus rocking them so that their lower projections Q are pressed against the rim surface, just as the projections P were, when the pulling action of the turnbuckle above described was in progress. With the rim thus slightly expanded, to a degree sufficient to break any rusted adhesion between the metal rim ends, the hand lever D with its connected parts is then employed to bend one rim end, as A for example, inwardly with respect to the rim end B. The outward pressure of the turnbuckle and its connected jaw pieces is then terminated by rotation of the turnbuckle in the opposite or inwardly-drawing direction, and further inward drawing of the rim ends by the lever piece D is indulged in. Then, if necessary, the turnbuckle is further actuated so that its jaws will pull the now started rim ends as far apart as possible, after which the lever piece D is again brought into action if required.

What I claim is:

In combination with a pair of rim-engaging members, each having a fixed jaw and an obliquely adjustable jaw, whereby rims of varying width and depth may be rigidly engaged, said pairs of rim-engaging members being adapted to be temporarily affixed about those portions of a rim selectively adjacent its meeting ends, means connecting the inner ends of said rim-engaging members for regulatably drawing them and their then connected portions of the seized rim inwardly to effect the separation of the outer surface of the rim from the surrounding inner surface of a vehicle tire.

In testimony whereof, I sign this specification in the presence of two witnesses.

GUSTAVE A. MEYER.

Witnesses:
WILLIAM M. SWAN,
JEFFERSON G. THURBER.